Patented May 5, 1925.

1,536,843

UNITED STATES PATENT OFFICE.

THOMAS H. HALL, OF SWARTHMORE, PENNSYLVANIA, ASSIGNOR TO THE BARRETT COMPANY, A CORPORATION OF NEW JERSEY.

DISINFECTANT.

No Drawing.  Application filed March 15, 1920. Serial No. 365,891.

*To all whom it may concern:*

Be it known that I, THOMAS H. HALL, a citizen of the United States, residing at Swarthmore, in the county of Delaware and State of Pennsylvania, have invented certain new and useful Improvements in Disinfectants, of which the following is a specification.

This invention has for its object an improved disinfectant or germicide which can be produced in large quantities at relatively small cost, and which shall possess a powerful effect as a microbicide even when used in small quantities.

It is well known that the phenolic derivatives of benzol and its alkyl substitution products are active bacteriocides. It is also well known that the phenolic derivatives of the condensed ring hydrocarbons such as naphthalene show similar bacteriocidal properties. This invention resides in the fact that I have discovered that the hydroxy derivatives of other aromatic hydrocarbons, to wit, diphenyl, and its alkyl derivatives, belonging to neither of these groups but containing two rings of six carbon atoms each, in direct combination, show bacteriocidal power far above that shown by the hydroxy derivatives of the other aromatic hydrocarbons previously described. The compound belonging to this group which I have found to be particularly applicable for disinfecting purposes is orthohydroxydiphenyl, although other hydroxy-derivatives of hydrocarbons having two benzene rings in direct combination possess this property in a remarkable degree and can be used with beneficial results. These compounds may be prepared synthetically as has been described previously in various works. They possess the advantage over the common phenolic bacteriocides that on account of their much higher germicidal power they can be used in much greater dilution than the less powerful bacteriocides. In these effective dilutions the toxicity of these substances is so greatly reduced that they are entirely innocuous to the human organism, whereas the effective dilutions of phenol and its related compounds are distinctly toxic.

I have also found that in the synthetic manufacture of phenolic compounds such, for example, as synthetic phenol, that there are obtained as by-products residues which have higher boiling points than the phenolic compounds themselves. Upon distilling the crude phenol, which may have been synthetically produced by starting with benzol and treating in well known ways, there are obtained residues which have a very high disinfecting value many times greater than phenol or carbolic acid. These residues have been found to consist of a number of compounds some of which are derivatives of diphenyl or dinaphthyl. Analysis has shown that a considerable portion of these residues is made up of o-hydroxydiphenyl and p-hydroxydiphenyl, and that the high disinfecting value is largely due to the presence of these compounds.

In practicing this invention a very satisfactory disinfectant can be obtained by using o-hydroxydiphenyl or mixtures of ortho- and para-hydroxydiphenyls which may be obtained as above indicated, or from other suitable sources. The material may be emulsified or dissolved, for example, in a mixture of hydrocarbon oil, water, and a rosin soap, a vegetable oil soap, an animal oil soap or mixtures of two or more of these soaps. The mixture is thoroughly stirred so as to distribute the ingredients uniformly and thereby form a homogeneous product. As a specific example of such a disinfectant, I may give the following: It is to be understood, however, that these proportions can be changed and also the relative proportion of ortho and para hydroxydiphenyl to each other can be widely changed without departing from the spirit and scope of this invention as set forth in the claims.

|  | Gms. |
|---|---|
| Neutral hydrocarbon | 26 |
| A mixture containing substantially 75% of ortho and 25% of parahydroxydiphenyl | 26 |
| Rosin | 36 |
| Caustic soda (1.3 specific gravity) | 12 |

When the disinfectant compounded according to the above formula, was tested by following the well known Rideal-Walker procedure, it was found to have a coefficient of 20 as is shown by the following table:

B. Typhosus, 24 hours' broth culture at

37° C. 15°–18° C. Temperature of medication

| Sample | Dilutions | Time culture exposed to action of disinfectant minutes | | | | | | Subcultures period of temp. incubation |
|---|---|---|---|---|---|---|---|---|
| | | 2½ | 5 | 7½ | 10 | 12½ | 15 | |
| Disinfectant | 1:1600 | – | – | – | – | – | . | |
| " | 1:1700 | + | – | – | – | – | – | |
| " | 1:1800 | + | + | – | – | – | – | 48 hrs. 37° C. |
| " | 1:1900 | + | + | ± | – | – | – | |
| Phenol | 1:90 | + | + | – | – | – | – | |

Rideal-Walker coefficient $= \frac{1800}{90} = 20$.

When o-hydroxydiphenyl alone is used in making the disinfectant, it may be dissolved in ordinary solvents such as alcohol, acetone, etc., and thus avoid the necessity of employing an oil and a soap. The p-hydroxydiphenyl alone is not readily emulsified by a soap solution and it is difficultly soluble in most of the ordinary solvents. But when it is mixed with o-hydroxydiphenyl it can be made up into an emulsion with oil and a soap, and a satisfactory disinfectant with a high Rideal-Walker coefficient is thus obtained.

A convenient method of preparing the disinfectant from any one or a mixture of these compounds is to dissolve the compound or the mixture in a suitable non-aqueous solvent such as alcohol, or to incorporate the compound or mixture in an emulsion consisting of an oil and a soap.

While the residues resulting from the distillation of the synthetically prepared crude phenol are a prolific source from which the materials for the improved disinfectant may be obtained, these materials may be obtained from other sources such as residues obtained in the distillation of crude beta naphthol, resorcinol, and other synthetic phenolic bodies, or they may be made synthetically as above stated. These residues contain hydroxyl derivatives of compounds which have at least two benzene rings or their residues in combination, and it appears that these derivatives are effective in imparting the desirable and valuable disinfecting properties to the solutions or emulsions.

These solutions or emulsions may be used in the usual ways for disinfectant purposes and even when they are greatly diluted they are found to possess a strong disinfecting power.

Disinfectants made in accordance with this invention have the advantage that they possess the characteristic of being odorless and practically tasteless in the dilution in which they are used. These factors render them valuable for disinfection of the mucous membrane of the human organism and even for internal disinfection, as, for example, intestinal disinfection.

The invention may be again illustrated by the following formula, as an example:

| | Parts. |
|---|---|
| Hydroxydiphenyl | 35 |
| Neutral hydrocarbon oil | 27 |
| Rice oil | 27 |
| Caustic soda solution (1.3 sp. gr.) | 11 |

A disinfectant made in this way when subjected to the well known Rideal-Walker test showed a coefficient of 35 as compared to the disinfecting power of phenol.

I claim:

1. As a new article of manufacture, a disinfectant containing a hydroxy derivative of a hydrocarbon containing two rings of six carbon atoms each in direct combination mixed with a hydrocarbon oil and soap.

2. As a new article of manufacture, a disinfectant containing a hydroxy derivative of diphenyl mixed with a hydrocarbon oil and soap.

3. As a new article of manufacture, a disinfectant containing ortho-hydroxy diphenyl mixed with a hydrocarbon oil and soap.

In testimony whereof I affix my signature.

THOMAS H. HALL.